United States Patent
Singh

(10) Patent No.: US 8,170,577 B2
(45) Date of Patent: May 1, 2012

(54) METHOD AND SYSTEM ENABLING USE OF WHITE SPACE RADIO SPECTRUM USING DIGITAL BROADCAST SIGNALS

(75) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 882 days.

(21) Appl. No.: 12/196,644

(22) Filed: Aug. 22, 2008

(65) Prior Publication Data
US 2010/0048234 A1 Feb. 25, 2010

(51) Int. Cl.
*H04W 72/00* (2009.01)
(52) U.S. Cl. ..... 455/454; 455/450; 455/451; 455/452.1; 455/452.2; 455/67.13; 370/329; 370/341; 725/95; 725/68
(58) Field of Classification Search .......... 455/450–455, 455/456.5–456.6, 464, 509, 516; 370/328–341, 370/431–463; 725/95, 68
See application file for complete search history.

(56) References Cited

U.S. PATENT DOCUMENTS

| | | |
|---|---|---|
| 5,696,903 A | 12/1997 | Mahany |
| 5,809,423 A | 9/1998 | Benveniste |
| 6,181,918 B1 | 1/2001 | Benveniste |
| 6,639,904 B1 | 10/2003 | Boyer et al. |
| 6,735,630 B1 | 5/2004 | Gelvin et al. |
| 6,826,607 B1 | 11/2004 | Gelvin et al. |
| 7,027,462 B2 | 4/2006 | Benveniste |
| 7,069,577 B2 | 6/2006 | Geile et al. |
| 7,085,637 B2 | 8/2006 | Breed et al. |
| 7,095,754 B2 | 8/2006 | Benveniste |
| 7,110,880 B2 | 9/2006 | Breed et al. |
| 7,202,776 B2 | 4/2007 | Breed |

(Continued)

FOREIGN PATENT DOCUMENTS
WO 2006120447 11/2006

OTHER PUBLICATIONS

Patent Cooperation Treaty, "International Search Report and Written Opinion", ISA/US, by Officer Blaine R. Copenheaver in PCT Application No. PCT/US09/046983, Document of 10 pages dated Jul. 30, 2009.

*Primary Examiner* — Kamran Afshar
*Assistant Examiner* — Kathy Wang-Hurst
(74) *Attorney, Agent, or Firm* — Guntin Meles & Gust, PLC; Pablo Meles

(57) ABSTRACT

A system (10) and method (50 or 70) of dynamic allocation of spectrum for a communication device where a UHF band is currently unused for licensed television broadcasting involves determining (51) a location of a user device using GPS or other signals (such as television broadcast signals) received at the user device using signal strength or time distance of arrival of those signals. The method can determine (52) which UHF television broadcast channels are available for use by the user device and determine (53) a maximum allowed transmission power for a given channel based on signal strength for the given channel and on adjacent channels before transmitting (54) the maximum allowed transmission power and location by the user device to a remote server for sharing information. The method can receive (55) polygon endpoints from a television broadcast defining the location of usable reception of the television broadcast.

19 Claims, 5 Drawing Sheets

U.S. PATENT DOCUMENTS

| | | |
|---|---|---|
| 7,274,708 B2 | 9/2007 | Benveniste |
| 7,289,972 B2 | 10/2007 | Rieser et al. |
| 2004/0028003 A1 | 2/2004 | Diener et al. |
| 2004/0047324 A1 | 3/2004 | Diener |
| 2006/0067354 A1 | 3/2006 | Waltho et al. |
| 2006/0083205 A1 | 4/2006 | Buddhikot et al. |
| 2006/0084444 A1 | 4/2006 | Kossi et al. |
| 2006/0167784 A1 | 7/2006 | Hoffberg |
| 2006/0258362 A1* | 11/2006 | Jin et al. .................. 455/450 |
| 2007/0133387 A1 | 6/2007 | Arslan et al. |
| 2007/0155489 A1 | 7/2007 | Beckley et al. |
| 2007/0230541 A1 | 10/2007 | Haartsen |
| 2007/0232358 A1 | 10/2007 | Sherman |
| 2007/0243877 A1 | 10/2007 | Elmalch |
| 2007/0249341 A1 | 10/2007 | Chu et al. |
| 2008/0089279 A1 | 4/2008 | Hu et al. |
| 2008/0102956 A1 | 5/2008 | Burman et al. |
| 2008/0102957 A1 | 5/2008 | Burman et al. |
| 2008/0154826 A1 | 6/2008 | Backof et al. |
| 2008/0155249 A1 | 6/2008 | Backof et al. |
| 2008/0159207 A1 | 7/2008 | Levine et al. |
| 2008/0178226 A1 | 7/2008 | Lee |
| 2009/0046625 A1* | 2/2009 | Diener et al. ............... 370/319 |

* cited by examiner

10

40

<u>45</u>

METHOD AND SYSTEM ENABLING USE OF WHITE SPACE RADIO SPECTRUM USING DIGITAL BROADCAST SIGNALS

FIELD

This invention relates generally to efficient use of available spectrum, and more particularly to system and method of allocating spectrum where both licensed and unlicensed or secondary licensed users share spectrum.

BACKGROUND

There has been a considerable amount of interest in dynamic allocations of radio spectrum. In traditional licensed models for radio spectrum, the task of how radio spectrum is left up to the network operator. Generally, radio spectrum is allocated (in time/space) in a semi-static basis and periodically re-allocated based on demand and network evolution. However in a case where spectrum is not controlled by a network operator (or even licensed to any party), spectrum users will have to determine how and when they can use radio spectrum without causing interference to other licensed users which are using co-channel or adjacent channels as well as other users which are unlicensed. In the current embodiments, both cases are addressed.

The primary objective in most communication systems is to avoid harmful interference to other licensed users which are on co-channel or adjacent channels in the same geographic area. These users have existing services which need to be protected in all cases. In cases where co channel or adjacent channel usage does not occur within a geographic region, the spectrum can be considered unused and can be made available to other users. One such example is the use of white spaces in television broadcast in the UHF band. "White spaces" are defined herein as the geographical areas where certain channels within the UHF band is not used for television broadcasting or other licensed purposes and "white space reception" is the reception of signals not used for broadcasting or other licensed purposes on the white spaces. There is great interest in using white spaces or under utilized and available spectrum. This is of great interest because many of the UHF band channels are not necessarily used for television reception in many areas. The UHF band is mostly used on a static basis. However, there has been interest by the broadcast industry in mobile reception of the broadcast signals. One needs to protect the fixed and mobile use of UHF band by licensed operators. There are several methods of protecting unlicensed users from each other. However, existing methods are not very efficient.

SUMMARY

Embodiments in accordance with the present invention can provide a method and system of using an out of band control channels to coordinate the interference free use of spectrum by multiple entities, including white spaces radio spectrum. In this embodiments herein, several techniques are described that can increase the spectral efficiency for unlicensed users.

In a first embodiment of the present invention, a method of dynamic allocation of spectrum for a communication device where a UHF band is currently unused for licensed television broadcasting involves determining a location of a user device using GPS or other signals (such as television broadcast signals) received at the user device using signal strength or time distance of arrival of those signals, determining which UHF television broadcast channels are available for use by the user device, determining a maximum allowed transmission power for a given channel based on signal strength for the given channel and on adjacent channels, and transmitting the maximum allowed transmission power and location by the user device to a remote server for sharing information with other devices. The user device can transmit the maximum allowed transmission power and location to a remote central server via a wired connection or a wireless connection.

The step of determining which UHF television broadcast channels is available for white space reception can be based on assuming that a channel cannot be used or is unsuitable for television reception when a co-channel user signal strength measurement is above a predetermined threshold when accounting for path loss in an immediate vicinity. The step of determining which UHF television broadcast channels is available for white space reception can also be based on assuming that a channel cannot be used or is unsuitable for television reception when a co-channel user signal strength measurement is above a predetermined threshold, but below a predetermined margin as compared to adjacent channels. The step of determining which UHF television broadcast channels is available for white space reception can also be based on assuming that a channel cannot be used for television reception when adjacent-channel user signal strength measurements are above a predetermined threshold. The step of determining which UHF television broadcast channels are in use can also be determined by assessing the geographic area defined as the protected contour of the UHF television station. The method can further comprise the step of receiving polygon endpoints from a television broadcast defining the location of usable or protected reception of the television broadcast where the step of determining which UHF television broadcast channels are available for use can be determined by the user device for a given location based on the location of the user device, the polygon endpoints, and signal strength measurements for co-channel and adjacent channels.

In a second embodiment of the present invention, a system of dynamic allocation of spectrum for a communication device where a UHF band is currently unused for licensed television broadcasting can include a transceiver and a processor coupled to the transceiver. The processor can be operable to determine a location of a user device using GPS or other signals received at the user device using signal strength or time distance of arrival of those signals, determine which UHF television broadcast channels are available for use by the user device for white space reception, determine a maximum allowed transmission power for a given channel based on signal strength for the given channel and on adjacent channels, and transmit the maximum allowed transmission power and location by the user device to a remote server for sharing information with other devices. The system can operate generally in a similar manner as described with the method embodiments described above.

In a third embodiment of the present invention, a method of dynamic allocation of spectrum for a communication device where a UHF band is currently unused for licensed television broadcasting can include the steps of determining a location of a user device using GPS or other signals received at the user device using signal strength or time distance of arrival of digital television signals, receiving polygon endpoints from a television broadcast defining the location of usable reception of the television broadcast, and determining which UHF television broadcast channels are available for use by the user device for a given location based on the location of the user device, the polygon endpoints, and signal strength measurements for co-channel and adjacent channels. The method can further include the step of receiving polygon endpoints for more than one television broadcast for a given area or for more than a single area.

In accordance with various embodiments of the present disclosure, the methods described herein can also be intended for operation as software programs running on a computer processor. Furthermore, software implementations can include, but not limited to, distributed processing or component/object distributed processing, parallel processing, or virtual machine processing can also be constructed to implement the methods described herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," "resizing program" and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
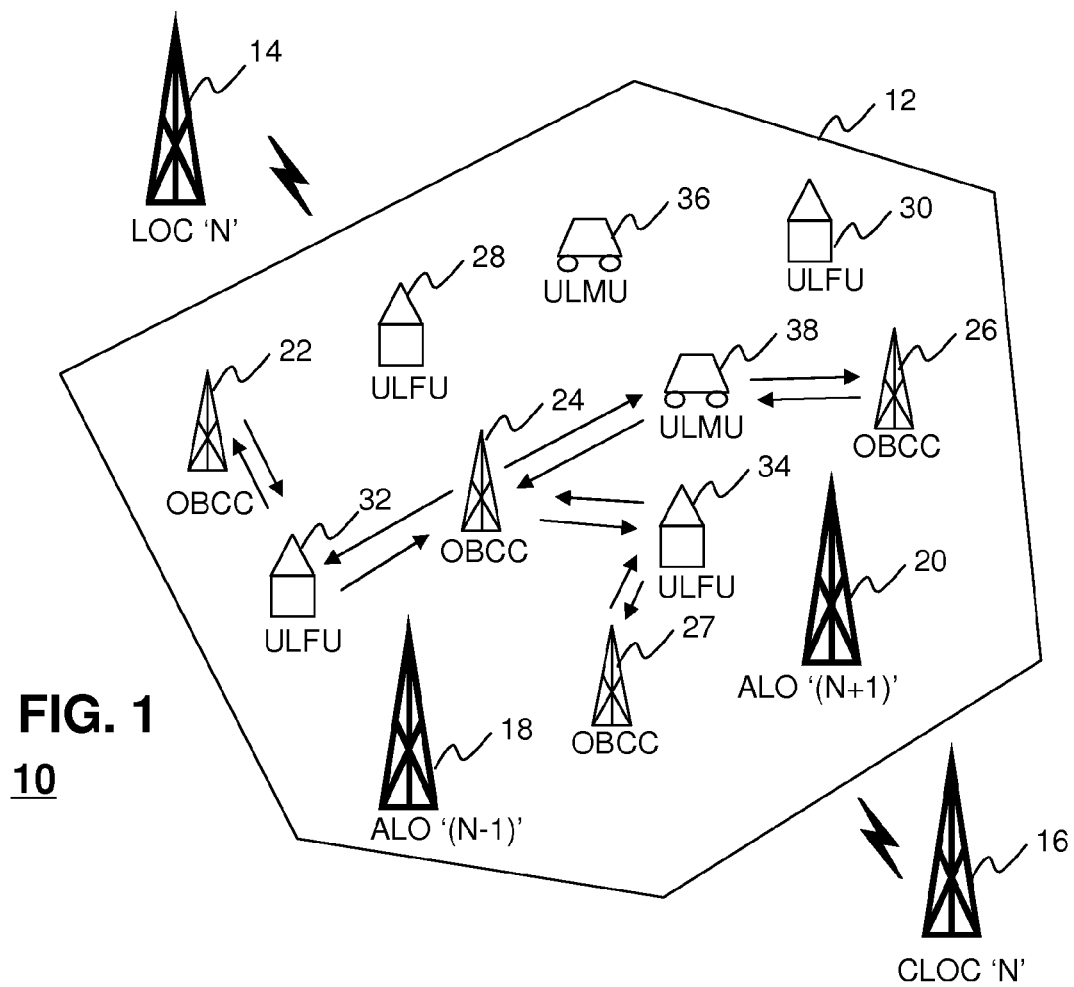
FIG. 1 is an illustration of a communication system using white spaces in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of ways using a variety of technologies that enable various techniques and systems enabling the efficient use of white space radio spectrum using an out of band control channel.

There are several autonomous, semiautonomous, and registration based techniques which can be used to enable the use of white spaces.

Methods described herein enable the use of white space radio spectrum using digital television broadcast signals. UHF spectrum can be used for broadband data in the areas where it is not used for television broadcasting. However, there is a great concern that such use of the UHF spectrum can result in harmful interference to television broadcast reception. If potential harmful interference can be avoided, it will result into large blocks (or channels) of UHF spectrum for the use in wireless broadband data transmission. Embodiments herein describe how potential for such interference can be reduced or eliminated with the use of broadcast signals from television broadcast stations.

Several methods herein involve the autonomous calculation of usable signals where a user device can be mobile or fixed. In any geographical area, one or more television channels are used for the transmission of digital television signals. In a first step, the location of a user device is determined. A user device (fixed or mobile) will determine its location (geographic location based on television signals or based on some other method such as GPS or assisted GPS). A user device may determine its location based on GPS when such signals are available and alternatively using television signals where a GPS signal is not available such as inside a building. A user device may determine its location based on television signals from decoding a bitstream of television signals or based on the signal strength of television signals or time of arrival of digital television signals.

In a second step, the user device makes an autonomous determination of usable UHF Channels. The user device can measure signal strength on multiple television broadcast channels. Based on the signal strength and Bit Error rate (BER) on these channels, it can determine if at the user location, television reception is possible on each of the channels under consideration. The user device can determine based on the signal strength on certain channels and adjacent channels, what level of power flux density will not cause harmful interference. Maximum allowed transmission power can be calculated for each channel based on the signal strength on that channel and adjacent channels. The user device may send (via wireless or wired) this information to a central location (and/or to other devices to share such calculations with the other devices. The central location may broadcast such information to other devices to assist them for their respective use of white spaces.

As an example, a user device can perform measurements on a channel under consideration such as channel 'N'. It is assumed that the user device may cause interference on channel 'N−1' and channel 'N+1' (or the adjacent channels). Additional or a second adjacent channel (N+2) and (N−1) may also be considered in the calculation. User device determines that signal strength on channel 'N' is equal to $S_N$, and similarly $S_{N-1}$ and $S_{N+1}$ on channels N−1 and channels N+1.

Thus, with respect to co-channel interference, if signal strength on channel N is below a certain threshold accounting for path loss in the immediate vicinity of the user device where signal strength calculation is performed, then it is assumed that channel 'N' cannot be used for television reception and therefore is available for the use by the device for white space reception. If signal strength $S_N$ is greater than the certain threshold but less than a certain margin as compared to the adjacent channels, channel 'N' cannot be used for the television reception and therefore is available for the use by the device for white space reception. If $S_N$ is greater than the certain threshold and greater than a certain margin as compared to adjacent channels, licensed use should be assumed and therefore the channel would be unavailable.

With respect to adjacent channel Interference, if the signal strength on the adjacent channel is below a certain threshold on both channels, then it is assumed that signal is not usable for television reception and therefore available for use by the user device for white space reception. If signal strength is greater than certain threshold on one or both channels, then a safety margin calculation can be performed based on the signal strength adjacent channel selectivity and path loss in the immediate vicinity of the device. If the safety margin exceeds a certain threshold, then it is assumed that channel 'N' is available for the user device for white space reception after considering adjacent channels 'N−1' and 'N+1'. The user device may be able to use a fraction of the channel 'N' depending on adjacent channels. For example, if the safety margin for channel 'N−1' is not met but it is met for the channel 'N+1', the user can use the portion of the channel 'N' closer to the channel 'N+1'. The calculations and location information can be transmitted to a central location and/or to the other users. The central location may share these calculations with the other users.

In another method, assisted calculation of the useable signals is described. In a first step similar to the autonomous calculation method, the user device will calculate its own location. In a second step, one or more than one television broadcast signal will transmit polygon endpoints for usable signal by itself (i.e., area of television reception in its own broadcast) and may transmit similar information for the other television broadcast signals. In a third step, based on its location and the endpoints for the channel 'N' and 'N+1' and 'N−1', the user device will calculate if channel N is usable at that location. The user device may consider its own measurement of $S_N$, $S_{N-1}$ and $S_{N+1}$ in conjunction with the polygon endpoints.

Referring to FIG. 1, a communication system 10 can include a polygon boundary 12 for a channel 'N'. Outside the boundary 12 can be a license operator on the white space channel 'N' designated as LOC 'N' 14 as well as a co-channel licensed operator on white space channel 'N' designated as CLOC 'N' 16. Within the polygon boundary 12 can be any number of network elements including adjacent channel licensed operators on white spaces channel (N−1) and (N+1) designated respectively as ALO '(N−1)' 18 and ALO '(N+1)' 20. Within the polygon boundary 12, there can also be a number of out of band control channels designated as OBCC 22, 24, 26 and 27, a number of unlicensed fixed users designated as ULFU 28, 30, 32, and 34, and a number of unlicensed mobile users designated as ULMU 36 and 38.

In autonomous mode, it is assumed that user has information regarding its location independent of a User Channel Map (UCM) or multilateration provided by a UCM network. Note, multilateration, also known as hyperbolic positioning, is the process of locating an object by accurately computing the time difference of arrival (TDOA) of a signal emitted from the object to three or more receivers. It also refers to the case of locating a receiver by measuring the TDOA of a signal transmitted from three or more synchronized transmitters. Based on the boundary comparison, a user device (fixed and/or mobile) can calculate which channels in the band under consideration can be used and determine the associated technical parameters. For example, a device may get its location information from GPS or assisted GPS. It may get the UCM for the UHF band from the UCM network from the television broadcast channel itself without using an separate control channel such as an out of band control channel. The user device can calculate which UHF channels it is allowed to use at that given location and associated technical parameters. If there is no licensed use (co-channel or adjacent channel) at that location as calculated by the UCM network, associated technical parameters for channel "N" in FIG. 1 can be relaxed.

The calculation of polygon endpoints is critical in many instances. More particularly, in the methods where UCM information is transmitted to the end user devices, geographical areas where licensed spectrum can be used is very critical. If the standard for such use is relaxed it has the potential to cause harmful interference to the licensed user. On the other hand, if such criteria are too restrictive, it will be detrimental to the spectral efficiency and decrease the available spectrum for all users. Therefore, a careful balance needs to be maintained. In the careful selection of technical parameters such as maximum transmit power, power control, duty cycle, an outbound band emission can assist to reduce the probability of harmful interference. The UCM network also should maintain a real-time status of the licensed use.

This problem is greatly simplified in the frequency bands which are used for one-way transmit networks such as UHF television broadcast networks. In this case, the television broadcast network transmits in one location. Most television receivers tend to be in fixed locations however, there may be an increased use of mobile television receiver devices in this band. The UCM network should protect both fixed and mobile devices from potential harmful interference.

For a harmful interference to occur there needs to be two conditions. One, there needs to be a usable radio signal from the licensed operator. This can be calculated and confirmed by real-world measurements if desired. Based on the radio signal propagation, calculation one can compute the percentage time and location, a radio signal is available. For example, for a television broadcast signal the percent of time a signal is available needs to be very high. Secondly, the user device depending on its transmit power and out of band emission, needs to be a certain distance from the receiver (licensed band receiver) to cause harmful interference.

The probability of such interference can also be calculated base on the technical parameters.

P1=Probability that a given location does not have coverage on white space channel 'N'

P2=Probability that a given user device is in close enough proximity of a receiver tuned to the licensed frequency to cause interference.

P3=Probability that a given user device will cause interference to a licensed user.

Assuming that the two events are independent, then $$P3=P1*P2$$

Figure 2:
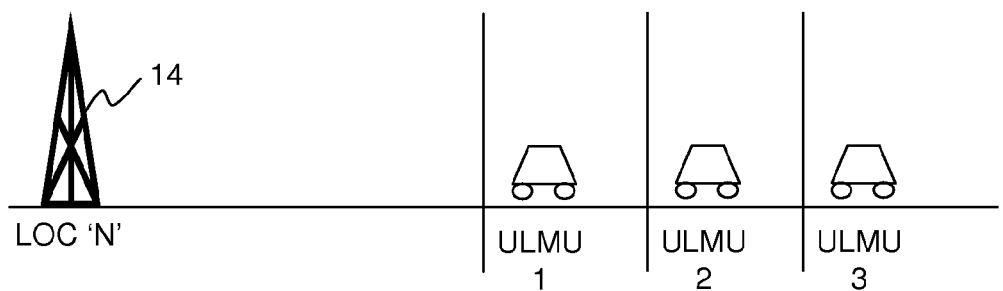
FIG. 2 is an illustration of communication system using white spaces and multiple polygons in accordance with an embodiment of the present invention.

The UCM method provides significant control to reduce the potential for harmful interference by controlling the P1 and P2 by the use of polygon endpoint calculation for a given channel. In a non-autonomous mode, a UCM network will have more effective control in managing P3, especially when adjacent channel interference is calculated. To allow a more efficient use of spectrum, the UCM may have multiple overlapping polygons for a given channel and the user device may select the best one for a given location. In FIG. 2, unlicensed mobile user 3 can transmit at a much higher power level on channel N, as compared to ULMU2 and ULMU1 while still maintaining P3 below a desired level. The same method can be applied to the adjacent channel. A user of a device who is willing to maintain a lower out of band emission may transmit at a higher power than a device with a less restrictive out of band emission while still maintaining P3 below the desired level.

The UCM network can refine these parameters with actual field co-channel and adjacent channel measurements apriori or ahead of time. This will allow the UCM network to create more fine-tuned multiple polygons. The method of receiving and updating UCM does not need to change.

Figure 3:
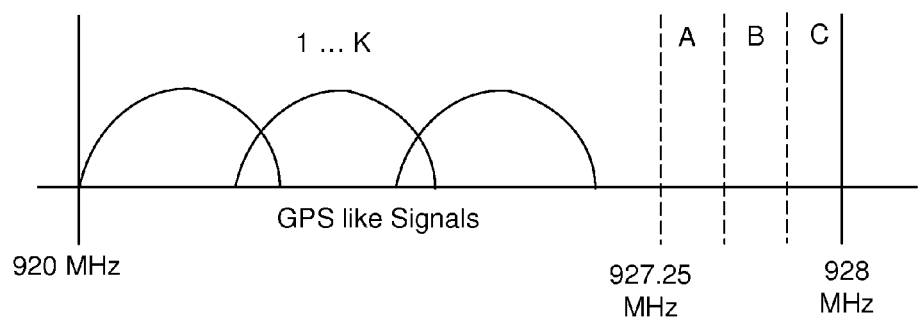
FIG. 3 is an illustration of frequency utilization using the 900 MHz LMS band in accordance with an embodiment of the present invention.

The 900 MHz LMS band has very good propagation characteristics and can be utilized effectively with the UCM network. The LMS band is licensed for position location using multilateration and a forward channel as shown in FIG. 3. In one network configuration, the system can use three higher power channels A, B, and C (up to 300 watts) for the control channel UCM and use the 920-927.25 band for the multilateration. In one example, one can transmit GPS like signals in the 920-927.5 band and GSM like signals on channels A, B. and C. User devices will receive standard GPS signals and also GPS like signals in the 920-927.5 band. These signals will be transmitted from OBCC transmitters (see FIG. 1) and user devices can use them for multilateration with or without GPS. This method will be very effective in urban or built-up areas. For registration, a user can use return links in the 902-920 MHz unlicensed band or some other band.

Figure 4:
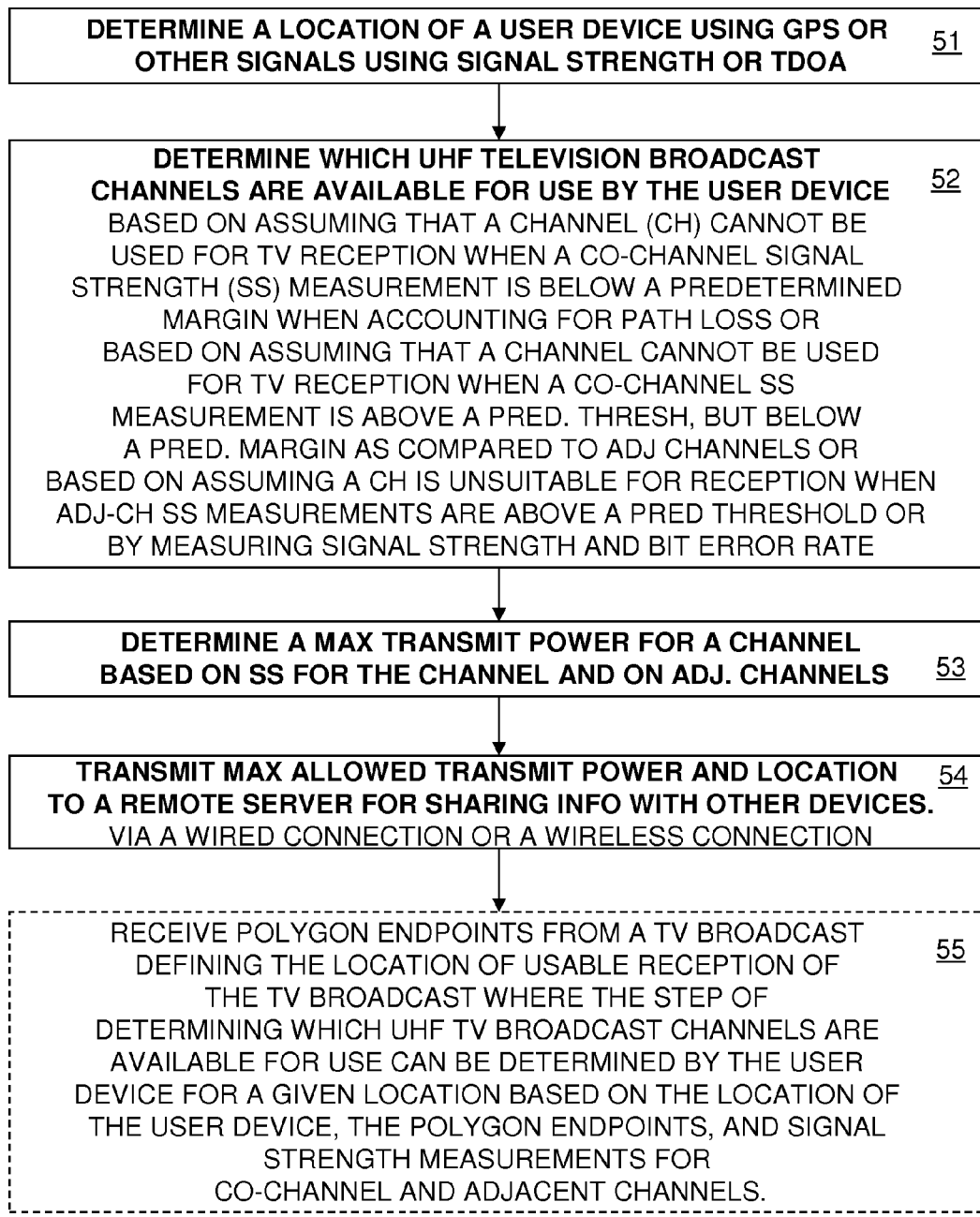
FIG. 4 is flow chart illustrating a method of allocating white spaces in accordance with an embodiment of the present invention.

Referring to FIG. 4, a flow chart for a method 50 of dynamic allocation of spectrum for a communication device where a UHF band is currently unused for licensed television broadcasting is shown. The spectrum can involve a band of radio frequencies used with a local, regional, or national frequency allocation that leads to a subset of the bands containing unused or available frequencies in any geographic area (such as television broadcast signals), but not all channels are used in all markets due to the need to protect receivers from interference from other stations. The method 50 can involve at 51 determining a location of a user device using GPS or other signals (such as television broadcast signals) received at the user device using signal strength or time distance of arrival of those signal. At 52, the method can determine which UHF television broadcast channels are available for use by the user device. This determination can be based on assuming that a channel cannot be used for television reception when a co-channel signal strength measurement is below a predetermined threshold when accounting for path loss in an immediate vicinity. The determination can be based on assuming that a channel cannot be used for television reception when a co-channel signal strength measurement is above a predetermined threshold, but below a predetermined margin as compared to adjacent channels. Or, the determination can be based on assuming that a channel cannot be used for television reception when adjacent-channel signal strength measurements are below a predetermined threshold. The determination of which UHG TV broadcast channels are available can be done by measuring signal strength and bit error rate. The method can further determine a maximum allowed transmission power for a given channel based on signal strength for the given channel and on adjacent channels at 53 and then transmit the maximum allowed transmission power and location by the user device to a remote server for sharing information with other devices at 54. The transmission of the maximum allowed transmission power and location to a remote central server can be via a wired connection or a wireless connection. At 55, the method can receive polygon endpoints from a television broadcast defining the location of usable reception of the television broadcast where the step of determining which UHF television broadcast channels are available for use can be determined by the user device for a given location based on the location of the user device, the polygon endpoints, and signal strength measurements for co-channel and adjacent channels.

Figure 5:
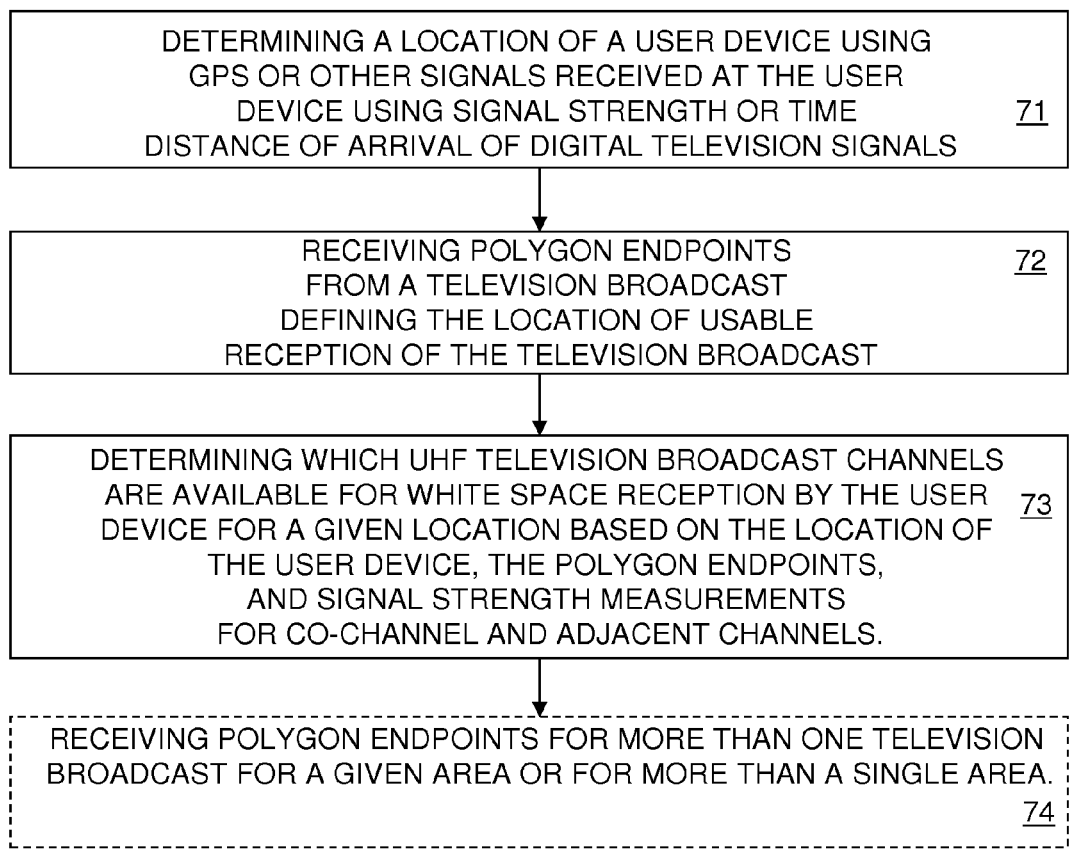
FIG. 5 is flow chart illustrating another method of allocating white spaces in accordance with an embodiment of the present invention.

Referring to FIG. 5, flow chart illustrating a method 70 of dynamic allocation of spectrum for a communication device where a UHF band is currently unused for licensed television broadcasting is shown. The method 70 can determine at 71a location of a user device using GPS or other signals received at the user device using signal strength or time distance of arrival of digital television signals. At 72, the method can receive polygon endpoints from a television broadcast defining the location of usable reception of the television broadcast. At 73, the method can determine which UHF television broadcast channels are available for use by the user device for a given location based on the location of the user device, the polygon endpoints, and signal strength measurements for co-channel and adjacent channels. Optionally, at 74, the method 70 can receive polygon endpoints for more than one television broadcast for a given area or for more than a single area.

Figure 6:
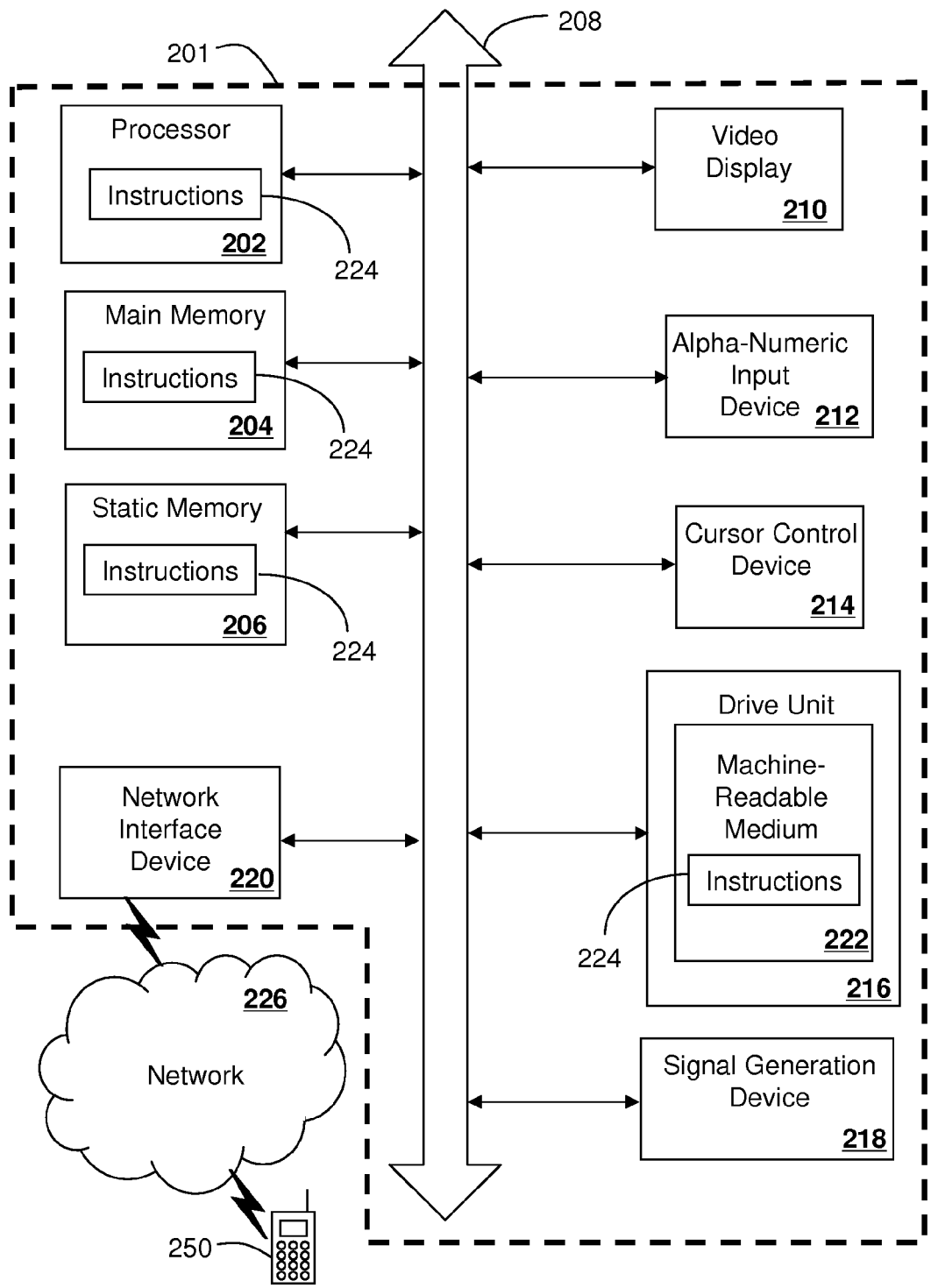
FIG. 6 is a block diagram of an electronic device in accordance with an embodiment of the present invention.

In another embodiment of the present invention as illustrated in the diagrammatic representation of FIG. 6, an electronic product such as a machine having a display 210 can include a processor or controller 202 coupled to the display. Generally, in various embodiments it can be thought of as a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such the display 210. The computer system 200 may include an input device 212 (e.g., a keyboard, microphone, etc.), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor or controller 202 during execution thereof by the computer system 200. The main memory 204 and the processor or controller 202 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of dynamic allocation of spectrum for a communication device where a UHF band is currently unused for licensed television broadcasting, comprising the steps of:
   determining a location of a user device using GPS or other signals received at the user device using signal strength or time distance of arrival of those signals;
   determining which UHF television broadcast channels are available for use by the user device for white space reception;
   determining a maximum allowed transmission power for a given channel based on signal strength for the given channel and on adjacent channels;
   transmitting the maximum allowed transmission power and location determined by the user device to a remote server for sharing information with other devices; and
   determining which UHF television broadcast channels are available for use by the user device for white space reception for a given location based on the location of the user device, polygon endpoints received from a television broadcast, and signal strength measurements for co-channel and adjacent channels.

2. The method of claim 1, wherein the user device transmits the maximum allowed transmission power and location to a remote central server via a wired connection.

3. The method of claim 1, wherein the user device transmits the maximum allowed transmission power and location to a remote central server via a wireless connection.

4. The method of claim 1, wherein the step of determining which UHF television broadcast channels is available for white space reception is based on assuming that a channel is unsuitable for television reception when a co-channel signal strength measurement is below a predetermined threshold when accounting for path loss in an immediate vicinity.

5. The method of claim 1, wherein the step of determining which UHF television broadcast channels is available for white space reception is based on assuming that a channel is unsuitable for television reception when a adjacent-channel signal strength measurement is below a predetermined threshold.

6. The method of claim 1, wherein the step of determining which UHF television broadcast channels is available for white space reception is based on assuming that a channel is unsuitable for television reception when co-channel signal strength measurements are above a predetermined threshold and below a predetermined margin as compared to adjacent channels.

7. The method of claim 1, wherein the step of determining which UHF television broadcast channels is available is done by measuring signal strength and bit error rate.

8. The method of claim 1, wherein the other signals received at the user device are digital television broadcast signals.

9. The method of claim 1, wherein the method further comprises the step of receiving the polygon endpoints from the television broadcast defining the location of usable reception of the television broadcast.

10. A system of dynamic allocation of spectrum for a communication device where a UHF band is currently unused for licensed television broadcasting, comprising:
   a transceiver; and
   a processor coupled to the transceiver, wherein the processor is operable to:

determine a location of a user device using GPS or other signals received at the user device using signal strength or time distance of arrival of those signals;

determine which UHF television broadcast channels are available for use by the user device for white space reception for a given location based on the location of the user device, polygon endpoints defining a location of usable reception of the television broadcast, and signal strength measurements for co-channel and adjacent channels;

determine a maximum allowed transmission power for a given channel based on signal strength for the given channel and on adjacent channels; and transmit the maximum allowed transmission power and location by the user device to a remote server for sharing information with other devices.

11. The system of claim 10, wherein the user device transmits the maximum allowed transmission power and location to a remote central server via a wired connection or a wireless connection.

12. The system of claim 10, wherein the processor determines which UHF television broadcast channels is available based on assuming that a channel is unsuitable for television reception when a co-channel signal strength measurement is below a predetermined threshold when accounting for path loss in an immediate vicinity.

13. The system of claim 10, wherein the processor determines which UHF television broadcast channels is available based on assuming that a channel is unsuitable for television reception when a co-channel signal strength measurement is above a predetermined threshold, but below a predetermined margin as compared to adjacent channels.

14. The system of claim 10, wherein the processor determines which UHF television broadcast channels is available based on assuming that a channel cannot be used for television reception when adjacent-channel signal strength measurements are below a predetermined threshold.

15. The system of claim 10, wherein the processor determines which UHF television broadcast channels is available measuring signal strength and bit error rate.

16. The system of claim 10, wherein the other signals received at the user device are digital television broadcast signals.

17. The system of claim 10, wherein the processor is further programmed to receive polygon endpoints from a television broadcast defining the location of usable reception of the television broadcast.

18. A method of dynamic allocation of spectrum for a communication device where a UHF band is currently unused for licensed television broadcasting, comprising the steps of:

determining a location of a user device using GPS or other signals received at the user device using signal strength or time distance of arrival of digital television signals;

receiving data defining polygon endpoints from a television broadcast defining the location of usable reception of the television broadcast;

determining a maximum allowed transmission power for a given channel based on signal strength for the given channel and on adjacent channels; and determining which UHF television broadcast channels are available for use for white space reception by the user device for a given location based on the location of the user device, the polygon endpoints, and signal strength measurements for co-channel and adjacent channels.

19. The method of claim 18, wherein the method further comprises the step of receiving polygon endpoints for more than one television broadcast for a given area or for more than a single area.

* * * * *